Oct. 2, 1928.  W. EVANS  1,686,078

MIXING DEVICE

Filed Nov. 7, 1927

Inventor
Wilson Evans
by Parks & Carter
Attorneys.

Patented Oct. 2, 1928.

1,686,078

UNITED STATES PATENT OFFICE.

WILSON EVANS, OF CHICAGO, ILLINOIS, ASSIGNOR, BY MESNE ASSIGNMENTS, TO NATIONAL ALUMINATE CORPORATION, OF CHICAGO, ILLINOIS, A CORPORATION OF DELAWARE.

MIXING DEVICE.

Application filed November 7, 1927. Serial No. 231,432.

My invention relates to improvements in mixing devices and has for one object to provide a new and improved mixing device by the use of which finely divided air dust like solid materials can be mixed with water. Another object is to provide such a mixing device so arranged that there will be no escape of the dust to the outside air. Other objects will appear from time to time throughout the specification and claims.

My invention is illustrated more or less diagrammatically in the accompanying drawings, wherein—

Like parts are indicated by like characters throughout the specification and drawings.

Figure 1:
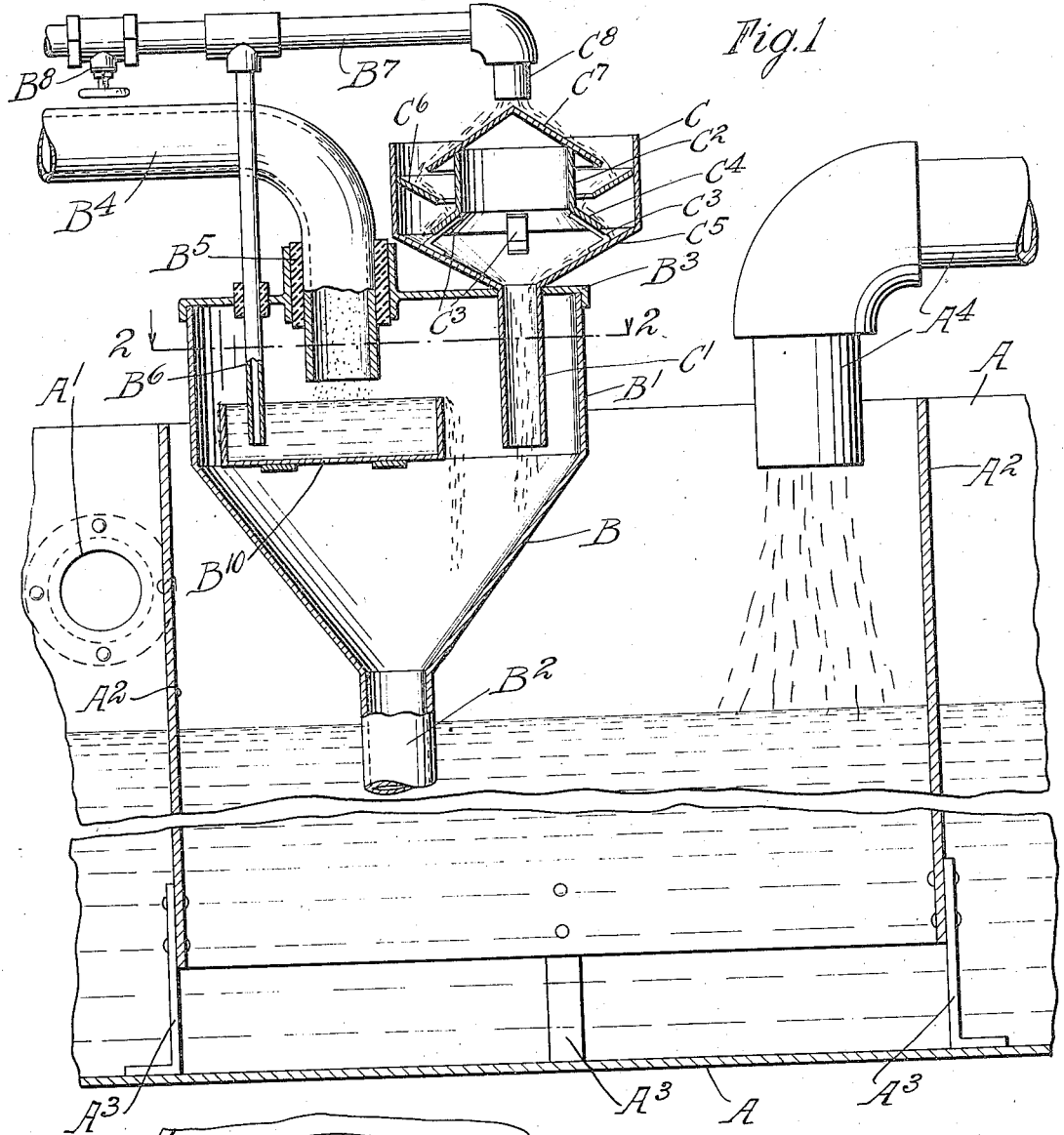
Figure 1 is a diagrammatic section.
Figure 2:
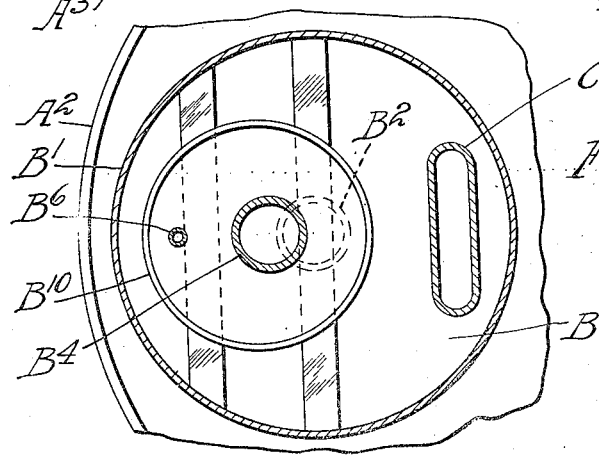
Figure 2 is a section along the line 2—2 of Figure 1.

I have illustrated my mixing device as applied to a water treating plant where the solid chemical is brought up to the water tank by a pneumatic conveyor which conveyor discharges the chemical into the water mixing it as the discharge takes place.

A is a water treatment tank. It has a run off pipe $A^1$ near the top. Contained within the tank is a down flow passage or stub tank $A^2$, supported from the bottom of the main tank by legs $A^3$. The water to be treated is fed into the top of this downflow receptacle through a discharge pipe $A^4$ and flows down into the main tank beneath the bottom of the receptacle $A^2$ and thence up and out through the discharge.

Located within the down flow tank is a funnel B having a cylindrical extension $B^1$ extending up above the top of the tank and a discharge pipe $B^2$ extending down into the downflow. This funnel has a substantially dust tight cover $B^3$. The pneumatic conveyor pipe $B^4$ extends through this cover downwardly into the funnel being insulated therefrom by a packing $B^5$ of oakum or other suitable material. The reason for this insulation is that owing to the fact that water is flowing through the funnel it is cold and likely to be much colder than the conveyor pipe. If the two are not insulated the conveyor pipe will be cooled, moisture will form and there is danger of the finely divided chemical which is being carried up through the conveyor pipe depositing on the inside walls thereof and clogging. The conveyor pipe is bent downwardly as indicated and discharges against the surface of the water in a pan $B^6$ supported in the open mouth of the funnel. The major part of the solids being projected by the air placed against the water are there caught and mixed immediately. The water in the pan is constantly renewed by flow through the pipe $B^6$ leading from a water main $B^7$ controlled by the valve $B^8$, the arrangement being such that there is constant flow of water into and overflow of water from the pan, which water drops down into the funnel.

Arranged at one side of the pan $B^6$ is an air filter C. This air filter comprises a funnel shaped housing having a downwardly extending pipe $C^1$. It contains a sleeve $C^2$ supported on brackets $C^3$ having a downwardly extended conical flange terminating above the conical bottom $C^5$ of the funnel. On the inside of the cylindrical extensions of the funnel is an annular conical shelf $C^6$ which terminates just above the flange $C^4$ and supported on the sleeve $C^2$ is a conical roof $C^7$ which terminates immediately above the flange $C^6$. Water is discharged from the pipe $B^7$ through the open thimble $C^8$ onto the roof $C^7$ at low velocity and low pressure. It runs down this roof and drops off onto the ring $C^6$, from there it drops down onto the flange $C^4$ thence onto the conical bottom and down into the main funnel B. The air which is forced up through the pipe $B^4$ into the funnel B escapes through this air filter passing through three sheets of water running off of each of the three conical water carrying surfaces. Thus all the dust in the air which was not trapped by the water in the pan is caught as the air rushes out through the filter and this dust is passed by the water down into the treatment tank. Since the water capacity of the pipe discharged into the pan and of the air filter is much less than the normal inflow of water to the tank, it is obvious that all the water used to trap the dust can be turned in with the main air supply without in any way interfering with the operation of the device. Since as a general rule the water head is only sufficient to get the water up to the top of the tank, it is necessary to have a spraying or filtering device which will work at low head and by the arrangement shown this is accomplished because the water even flowed in at low velocity distributes itself over the conical surfaces evenly all the way around and no appreciable dust is able to escape.

It will be understood that the details, dimensions and specific arrangement of the parts might be departed from without departing from the spirit of my invention and I wish that my drawing may be regarded as in a true sense diagrammatic.

While my invention has been shown and discussed as applied to water treating, it is obvious that other liquids than water might be used and that the invention includes not merely a water treatment but a treatment of any liquid of any kind whatever. Where the word "water" appears in the claims I wish it understood that this really refers to water or any other liquid which may be treated in any such manner.

I claim:

1. A mixing device for water treating plants and the like comprising a dust tight housing, a discharge passage leading therefrom and having its end immersed in the water, a pan contained within the housing, means for continuously supplying water to and permitting it to overflow therefrom, a pneumatic conveyor adapted to discharge air suspended solids into the housing against the water in the pan, an air discharge vent from the housing, means located within the vent for washing the air and means for mixing the air washing water with the pan water.

2. A mixing device for water treating plants and the like comprising a dust tight housing, a discharge passage leading therefrom and having its end immersed in the water, a pan contained within the housing, means for continuously supplying water to and permitting it to overflow therefrom, a pneumatic conveyor adapted to discharge air suspended solids into the housing against the water in the pan, an air discharge vent from the housing, means for maintaining a sheet of flowing water across the discharge vent through which the water passes, the water being discharged through the discharge passage.

3. A mixing device for water treating plants and the like comprising a dust tight housing, a water receiving pan therein, means for supplying water to and causing it to overflow from said pan, a pneumatic conveyor discharging air floated solids against the water in said pan, an exhaust vent from the housing for the air, means for washing said air and for mixing the wash water and the water from the pan.

4. A mixing device for water treating plants and the like comprising a dust tight housing, a water receiving pan therein, means for supplying water to and causing it to overflow from said pan, a pneumatic conveyor discharging air floated solids against the water in said pan, an exhaust vent from the housing for the air, means for washing said air and for mixing the wash water and the water from the pan, a dust tight heat insulating packing interposed between the pneumatic conveyor and the wall of the housing.

5. The process of mixing finely divided solids with water in water treating plants and the like wherein the solids are projected pneumatically against the surface of a relatively small continuously renewed body of water wherein the air is drawn off and washed with water which is mixed with the water against which the dust is projected and wherein the resultant water is mixed with the main supply of water to the plant.

6. A mixing device comprising a pneumatic dust conveying tube downwardly disposed at its discharge end, a liquid containing pan adapted to receive the discharge from the tube, means for supplying liquid to the pan continuously to permit it to overflow, a housing containing the pan, and the discharge end of the pneumatic conveyor, a dust tight heat insulating packing interposed between the housing and the conveyor.

7. A mixing device comprising a pneumatic dust conveying tube downwardly disposed at its discharge end, a liquid containing pan adapted to receive the discharge from the tube, means for supplying liquid to the pan continuously to permit it to overflow, a housing containing the pan, and the discharge end of the pneumatic conveyor, a dust tight heat insulating packing interposed between the housing and the conveyor, a conduit through which liquid may be discharged from the housing, an air escape passage from the housing and a liquid operated dust separator located within such passage and means for mixing the dust separator liquid with the pan liquid.

8. A mixing device for water treating plants and the like comprising a dust tight housing, means for continuously maintaining and renewing a sheet of water in the housing, a pneumatic conveyor adapted to discharge air-suspended solids into the housing against the sheet of water, an air discharge vent from the housing, means located therein for washing the air and means for mixing the wash water with the water supplied to the housing.

9. A mixing device for water treating plants and the like comprising a dust tight housing, means for continuously supplying water to the housing, means for withdrawing the water therefrom, a pneumatic conveyor adapted to discharge air suspended solids into the housing into contact with the water, an air vent through which the spent air may leave the housing, means for washing such spent air and for mixing the wash water with the other water supplied to the housing.

10. In a liquid treating plant a mixing chamber, a liquid supply means therefor, pneumatic means for supplying solids to the chamber and mixing the solids with the liquid, means for washing the spent air as it leaves the chamber and means for mixing the wash water with the liquid supply.

11. The process of treating liquids which consists in conveying solids by a gas stream to and discharging them into intimate relation with a liquid supply, in a closed chamber withdrawing the spent gas, washing it, mixing the washing liquid with the liquid supply above referred to, and mixing the resultant liquid with the liquid to be treated.

Signed at Chicago, county of Cook, and State of Illinois, this 1st day of November, 1927.

WILSON EVANS.